Dec. 16, 1924.

H. L. MERRICK

WEIGHING MECHANISM

Filed Jan. 21, 1921 4 Sheets-Sheet 1

Inventor
H. L. Merrick
By his Attorney

Dec. 16, 1924.

H. L. MERRICK

WEIGHING MECHANISM

Filed Jan. 21, 1921    4 Sheets-Sheet 2

Inventor
H. L. Merrick
By his Attorney
John O. Seifert

Dec. 16, 1924.                                                      1,519,151
H. L. MERRICK
WEIGHING MECHANISM
Filed Jan. 21, 1921                        4 Sheets-Sheet 4

Inventor
H. L. Merrick
By his Attorney

Patented Dec. 16, 1924.

1,519,151

UNITED STATES PATENT OFFICE.

HERBERT L. MERRICK, OF PASSAIC, NEW JERSEY.

WEIGHING MECHANISM.

Application filed January 21, 1921. Serial No. 438,821.

*To all whom it may concern:*

Be it known that I, HERBERT L. MERRICK, a citizen of the United States, and a resident of Passaic, in the county of Passaic and State of New Jersey, have invented certain new and useful Improvements in Weighing Mechanism, of which the following is a specification.

This invention relates to weighing mechanism, and it is an object of the invention to automatically adjust a counterpoise or poise weight and control the adjustment thereof by a load being weighed to counterbalance such load to bring the weighing mechanism into equilibrium with the load supported thereby.

It is a further object of the invention to provide in weighing mechanism of the pivotally supported weighing beam type arranged to support a load therefrom and to be maintained in equilibrium by counterpoise weight movable along the weighing beam, means to automatically adjust the counterpoise along the beam and control such adjustment through the deflection of the weighing beam by a load supported thereby.

It is another object of the invention to provide means to make a printed record of the weight of successive weighings.

It is a further object of the invention to provide means to indicate whether the weighing mechanism was in equilibrium or in overload or underload position when the record of the weighing was made.

It is another object of the invention to provide means to make consecutively record numbers of successive weighings in connection with the record of the successive weighings.

It is a still further object of the invention to provide means to totalize the weight of successive weighings and to indicate such total weight.

In carrying out the embodiment of the invention illustrated in the drawings accompanying and forming a part of this specification I provide a fulcrumed scale-beam to which load receiving means, such as a platform, is operatively connected, and the beam brought into equilibrium with a load upon the load receiver by counterpoise automatically adjusted along the scale-beam by means controlled by the load supported by the scale-beam, said means comprising a pair of cooperating members one of which is rotatable and operative to drive the other member, said rotatable member being connected to the counterpoise and movable in a direction longitudinally of the scale-beam and the direction and velocity of such longitudinal movement being determined by the angular relation between the axes of rotation of the two members, the angular relation being controlled by and in accordance with the deflection of the scale-beam caused by the applying of a load to or the removal of a load from the scale-beam. Printing mechanism is provided to make a printed record of successive weighings, said means including a member arranged with impression making devices participating in the movement of the counterpoise as it is adjusted along the beam. Means are also provided operative simultaneously with the means to make a record of the successive weighings, to number each such weighing record consecutively; and means are also provided to totalize the weight of successive weighings and to indicate such total weight, said means being operable from and controlled by the movement of the impression device carrying member.

In the drawings

Similar characters of reference designate like parts throughout the different views of the drawings.

Figures 3, 4, 5:
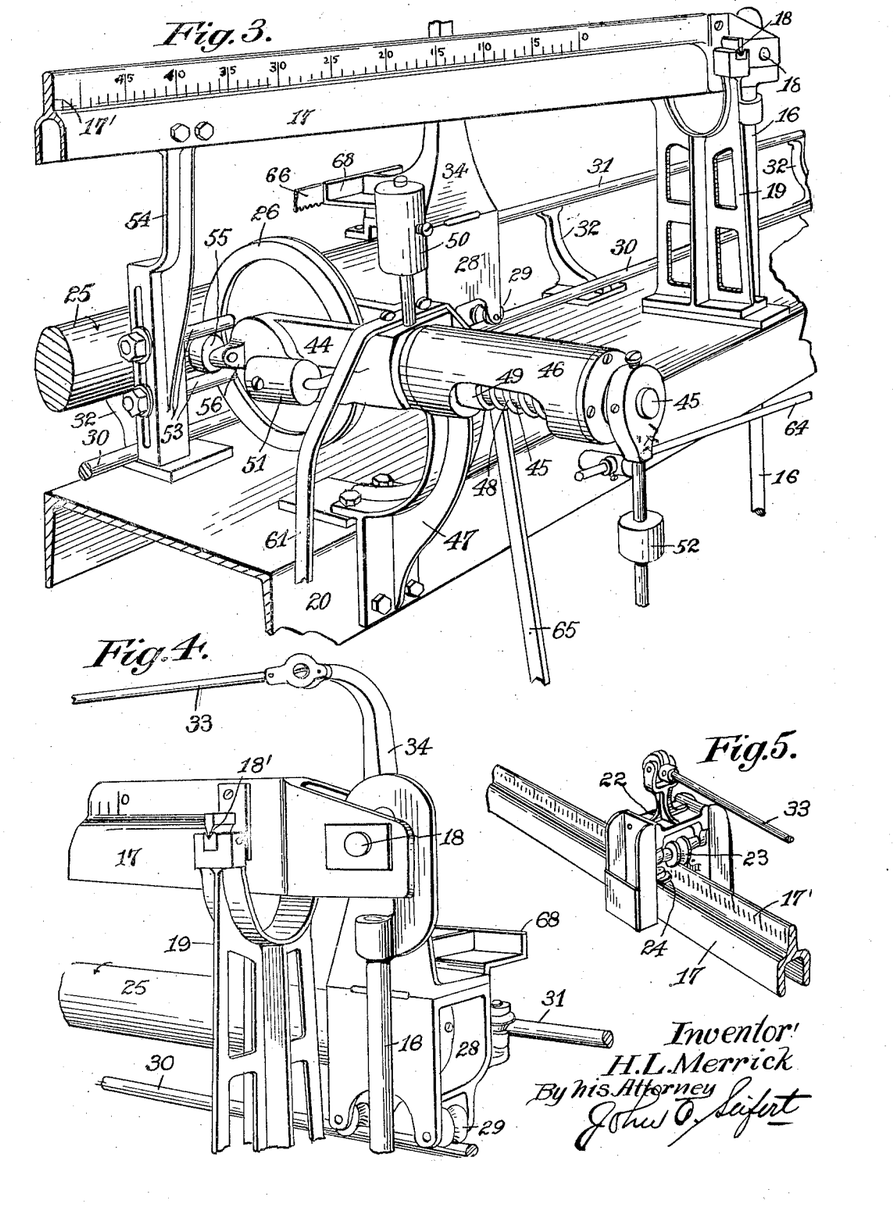
Figure 3 is an enlarged view in perspective of the means for causing the rotatable member connected to the counterpoise to move longitudinally and showing the manner of controlling the movement thereof from the scale-beam.
Figure 4 is an enlarged detail view in perspective to show the manner of mounting the longitudinally movable member at the end opposite to that shown in Figure 2.
Figure 5 is a detail view in perspective showing the mounting of the counterpoise upon the scale-beam and the connection thereof with the means to adjust the same along the scale-beam.

In the drawings I have shown an embodiment of my invention in connection with weighing mechanism of the type in which the load to be weighed is received upon a platform, shown in a general way at 15, supported by weighing levers (not shown) and connected thereto by a rod 16 having a knife edge pivot connection 18 with one end of a scale-beam 17 fulcrumed or pivotally supported by knife edge bearings projecting from opposite sides of the beam, as at 18' upon a bracket 19 mounted upon a shelf 20 supported by columns 21. The scale-beam is of bifurcated structure in cross section with the bifurcation at the bottom, as shown in Figures 3 and 5, and upon which is mounted a counterpoise or poise weight as shown in a general way at 22 in Figure 5, to have adjustment along the beam. The counterpoise is arranged to engage at opposite sides of the beam, and to permit of ready and practically frictionless adjustment along the beam it is mounted upon the beam through a bifurcated roller 23 rotatably carried by the counterpoise engaging the upper portion 17' of the beam, and the portions of the counterpoise at opposite sides of the beam carry rollers 24 to engage opposite sides of the portion 17' of the scale-beam to prevent lateral or canting movement of the counterpoise upon the beam. This counterpoise is also arranged to co-operate with the graduations on the scale beam to indicate the weight of a load.

To automatically and mechanically adjust the counterpoise along the scale-beam when the scale-beam has been deflected from the horizontal or moved out of equilibrium by the placing of a load upon the load receiver to counterbalance and weigh such load, and to again bring the beam to equilibrium when the scale-beam has been relieved of the weight of the load by the removal of the same from the load receiver, I provide a pair of rotatable members 25, 26, the member 25 comprising a drum or roller and the other member 26 being shown in the form of a disk to frictionally engage the drum. The drum is journaled at opposite ends in members 27, 28, said members with the drum constituting a carriage mounted by rollers 29 carried by the members 27, 28 upon a track consisting of rails 30, 31 fixed to brackets 32 mounted upon the shelf 20, the rail 31 being in a plane higher than the rail 30 and adapted to take up lateral thrust of the carriage exerted thereon through the frictional engagement of the disk 26 with the drum. The track extends substantially parallel with the scale-beam whereby the carriage is adapted to have to and fro or reciprocating movement in a direction longitudinally of the beam. To transmit the reciprocating longitudinal movement of the carriage to the counterpoise 22 the latter is connected to the carriage by a rod 33 pivotally connected at one end to the counterpoise and at the opposite end to an upwardly extending arm 34 fixed to the carriage member 28.

The drum is continuously driven in the direction of the arrow by an electric motor, designated in a general way by M, suitably connected to a source of power, mounted upon the member 27 and is operatively connected to the drum by a belt 35 passing around a pulley 36 on the shaft of the motor and a pulley 37 fixed to a shaft 38 rotatably carried by the carriage member 27, a pinion 39 on the shaft 38 meshing with a gear 40 fixed to the shaft 41 also rotatably carried by the carriage member 27, and a pinion 42 on said latter shaft meshing with a gear 43 rotatable with the drum.

The driven member or disk 26 is rotatably carried by a forked or bifurcated member 44 carried at one end of a shouldered shaft 45 journaled in a sleeve portion 46 of a bracket 47 mounted upon the shelf 20 and normally urged in a direction to cause the disk to yieldingly engage the drum by a spring 48 coiled about the shaft 45 and confined between the end of the sleeve 46 and a collar 49 adjustably secured to the shaft, the spring and collar being located in a cutaway portion of the bracket sleeve 46 to permit of ready adjustment of the collar to increase or decrease the tension of the spring. The disk support is normally maintained in position to rotate on an axis in a plane parallel with the axis of the drum by pendulum weights, one of which as 50 is adjustably mounted upon an arm projecting up from the disk support, another 51 adjustably mounted upon an arm extending laterally from the side of said support, and a third 52 suspended from the end of the shaft 45 projecting from the end of the bracket sleeve 46.

The drum carriage is adapted to have movement along the track axially of the drum and in opposite directions, and such movement of the drum is controlled by the direction of travel of the member 26 in angular relation to the axis of the drum 25, the direction of movement of the member 26 being controlled by the deflection of the scale-beam as it is moved out of equilibrium by the applying of a load to or its removal from the scale-beam and the bringing of the scale-beam into equilibrium by the adjustment of the counterpoise along the same, and the velocity of the movement of the counterpoise is proportional to the amount of deflection of the scale beam, the movement of the counterpoise gradually decreasing as the beam approaches the position of perfect balance with the result that there is no overrun of the counterpoise on the beam.

Figure 11:
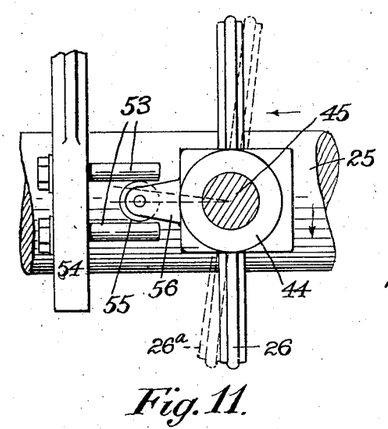
Figures 11 and 12 are front elevations of the means to automatically adjust the counterpoise upon the scale-beam and showing the driven member in different relations to the rotatable member whereby they co-operate to move the rotatable member longitudinally and control the direction of such movement.

In the normal no load position of the weighing mechanism the counterpoise 22 is in position on the scale-beam adjacent the end near its pivotal support 18′ with the disk 26 in position to rotate on an axis parallel with the axis of the drum, as shown in full lines in Figure 11. In this position of the disk with relation to the drum the drum will be held by the disk against axial movement. As a load is placed upon the load receiver or platform the end of the scale-beam opposite its connection with the load receiver is deflected or moved upward through the connection of the beam with the load receiver by the rod 16. Simultaneously with this movement of the scale-beam the disk 26 is adjusted about an axis transverse to its axis of rotation to change the direction of travel of the disk with the axis thereof extending in angular relation to the axis of the drum, as shown in dotted lines at 26ª in Figure 11, by means of a pair of fingers 53 adjustably mounted in a slot of a bracket 54 suspended from the scale-beam (Figure 3) engaging at opposite sides of a roller 55 rotatably carried by a lug 56 projecting laterally from the disk support 44.

Figure 12:
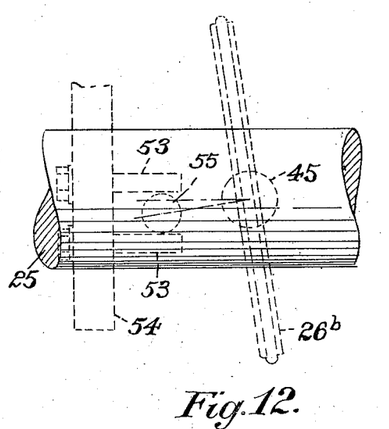
Figure 13:
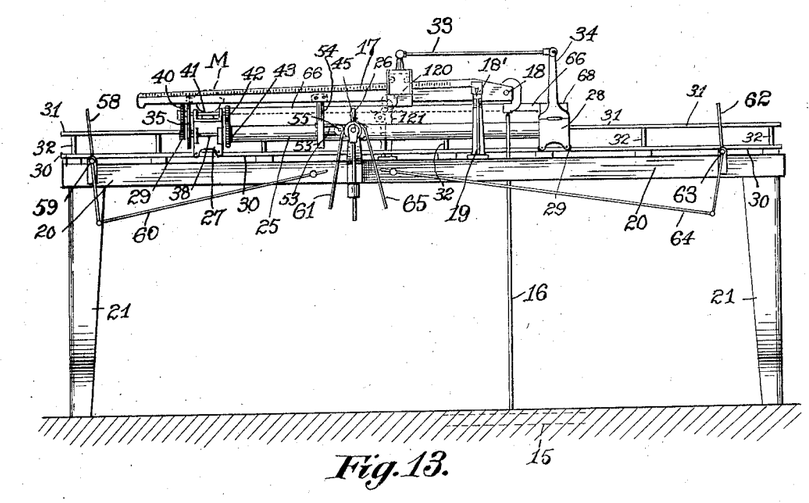
Figure 13 is a front elevation of weighing mechanism showing an embodiment of my invention.

In this position of the disk the rotation of the disk will exert a pushing force to move the drum in the direction of the arrow (Figure 11) and move the counterpoise 22 along the scale-beam in a direction toward the higher end of the beam due to the thrust of the circumferential force applied to the drum by the disk, and as the counterpoise approaches the position to counterbalance the load the angular position of the disk relative to the drum will be varied until the beam is brought to perfect balance when the disk will be in position to rotate on an axis parallel with the axis of the drum. As the counterpoise approaches the position to bring the scale-beam to equilibrium the movement of the counterpoise is gradually retarded in accordance with the angular position of the disk relative to the drum and thereby tends to prevent the tendency of the counterpoise to overrun its correct position and overbalance the load being weighed, this steadying of the counterpoise being facilitated by the pendulum weights carried by the disk supporting means. Should the counterpoise overrun its correct position for equilibrium due to the inertia of the scale beam, the downward deflection of the beam carried thereby will act upon the disk 26 to cause the counterpoise to return to its correct position. As the load is removed from the scale-beam due to the forward position of the counterpoise 22 the forward end of the scale-beam is deflected to incline downward and the axis of rotation of the disk will be adjusted to an angular position relative to the axis of the drum through the connection of the disk support with the scale-beam to incline in a direction opposite to that when the counterpoise is being moved forward, as shown in dotted lines in a diagrammatic manner at 26ᵇ in Figure 12, and the axial component of the circumferential force applied by the disk to the drum will operate to push the drum and thereby the counterpoise in a direction opposite to that in which it was moved when a load was being weighed or counterbalanced, and this return movement of the carriage will be continued until the beam is restored to initial position of equilibrium and in position to weigh another load.

It will be noted that the traveling counterpoise weight is moved so as to counterbalance a load being weighed in a manner similar to that as in ordinary hand weighing, but that the counterpoise is moved automatically to exact counterbalance position, and when the load is removed from the scale-beam the counterpoise is automatically returned to initial position.

To prevent the drum carriage and counterpoise from overriding the length of the scale-beam as by placing a load upon the load receiver greater than the capacity of the weighing mechanism a stop 58 is provided, this stop comprising an arm carried by a rock shaft 59 to project up into the path of movement of the drum carriage and adapted to be engaged by the drum carriage as it reaches a predetermined position, such engagement rocking the shaft 59 and thereby moving a rod 60 to position to engage an actuator arm 61 fixed to and extending downward at one side of the disk support and operating to move said support and thereby adjust the disk 26 from the dotted line position 26$^a$ to the full line position shown in Figure 11 with the axial component thereof in alinement with the axis of the drum. Should the drum carriage be moved quickly in an opposite direction due to the sudden removal of the load from the scale-beam as the drum carriage approaches a predetermined position it will engage a stop 62 carried by a rock shaft 63 to project up into the path of movement of the drum carriage and the engagement thereof by the drum carriage will rock the shaft and move a rod 64 connected to the shaft to engage an arm 65 fixed to and extending downward from the disk support at the side opposite to the arm 61 and move the disk from the dotted line position 26$^b$ shown in Figure 12 to the full line position shown in Figure 11 with the axis of the disk in alinement or parallel with the axis of the drum and with the counterpoise in position to maintain the scale-beam in equilibrium.

Figures 6, 7, 8, 9, 10:
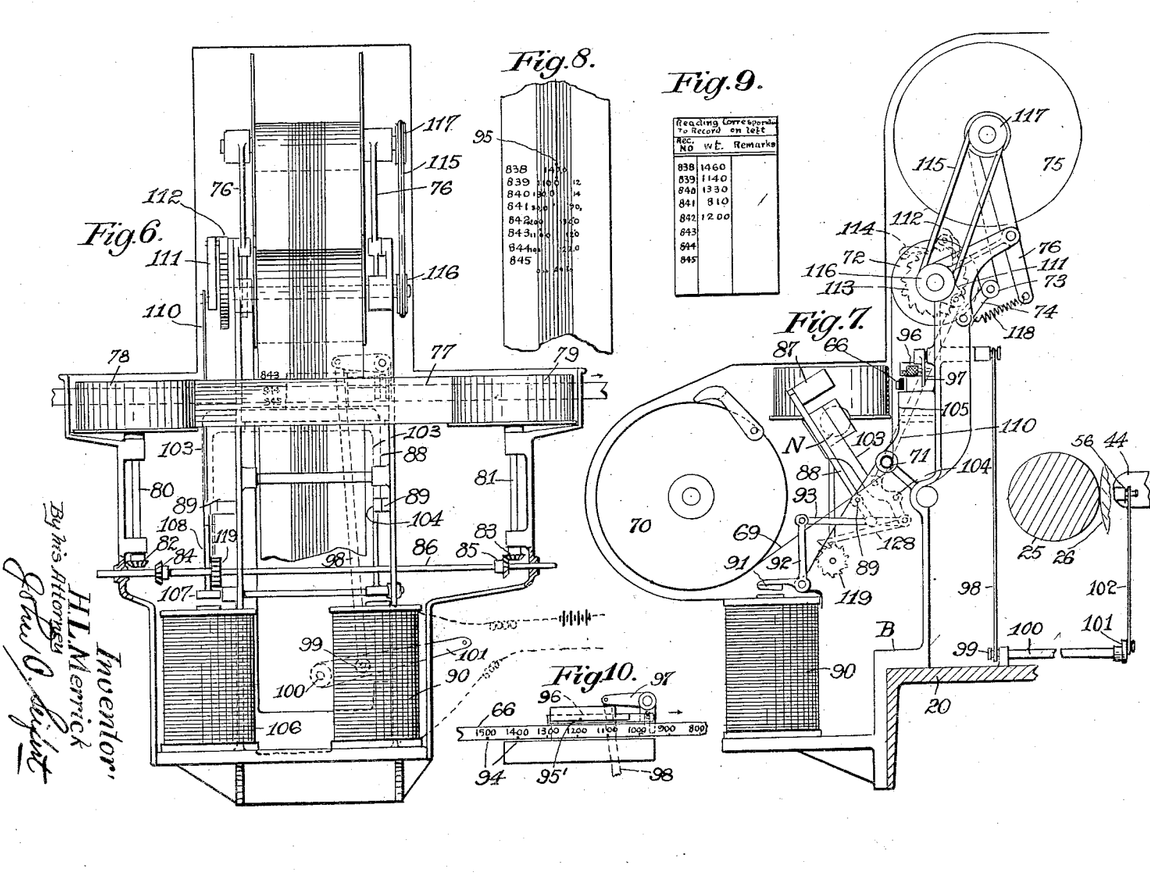
Figure 6 is a front elevation of the means for making a printed record of the successive weighings and a record of the consecutive number of the weighings.
Figure 7 is a side elevation of the record making means shown in Figure 6, and showing the same in relation to the means to adjust the counterpoise on the scale-beam.
Figure 8 is a view of a portion of the web upon which a record of the successive weighings is made and showing the manner of making such record.
Figure 9 is a view of a chart to serve as a guide for the reading of the record made on the web shown in Figure 8.
Figure 10 is a detail view of a portion of the means from which the record of successive weighings is made and showing means in relation thereto to indicate on the record as it is made whether the beam was in equilibrium or not.

To make a printed record of successive weighings impression or printing mechanism is provided. This mechanism comprises a beam or bar 66 fixed at one end to an angle portion 67 at the rear of the carriage member 27, and at the opposite end to an angle portion 68 at the rear of the carriage member 28 to extend in a direction longitudinally of the scale-beam and having digits and graduations on the rear face to correspond with the graduations of the scale-beam with the digits reading in a direction from right to left as viewed from the rear of the mechanism and in a direction reverse to the reading of the graduations on the scale-beam, as shown in Figure 10, and is movable longitudinally with the drum carriage in accordance with the movements of said carriage and the movements of the counterpoise along the scale-beam. The digits or characters are raised from the face of the bar to facilitate the making of an impression. The printed record is made on a web or strip 69 which is fed from a reel 70 rotatably supported by a bracket, shown in a general way at B, mounted at the rear of the shelf 20. The web extends and is fed transversely of the beam by passing around rollers 71 and 72 to maintain the same contiguous to the bar 66, and around an idler roller 73 carried by a pivotally supported arm 74 to a take-up roller 75 rotatably carried at one end of a pivoted lever 76. An ink ribbon 77 is interposed between the bar 66 and the web, said ribbon being fed transversely of the web from one spool, as 78, to another spool 79 mounted upon shafts 80, 81 rotatable on vertical axes having bevel pinions 82, 83 fixed thereto adapted to mesh with bevel pinions 84, 85 on a longitudinally adjustable shaft 86. With the pinion 85 in mesh with the pinion 83 the ribbon will be wound upon the spool 79 from spool 78 and will be fed in reverse direction when the pinions 82, 84 are in mesh. An impression is made upon the web by impinging said web against the bar 66 and for this purpose a platen or hammer 87 is provided, said platen being carried by a yoke 88 pivotally supported, as at 89. The platen is actuated through electromagnetically operated means consisting of a magnet 90 which may be connected in a normally open circuit and as the circuit is closed attracts an armature 91 to the core thereof, said armature being carried by one arm of an angle lever 92 the other arm of which is connected to the yoke 88 by a link 93. As the circuit for the magnet is closed, as by the actuation of a push button or the moving of a switch, which may be accomplished either manually or automatically as the scale beam is brought to equilibrium, the armature is attracted toward the core of the magnet rocking the lever 92 and thereby moving the platen against the member 66.

The record strip or web has a series of parallel lines extending longitudinally and centrally thereof, as shown in Figure 8, the width of the web occupied by such lines being equivalent to the space between adjacent digits on the bar 66, and the space between successive lines being representative of a predetermined weight, in the present instance and for illustrative purposes being ten pounds, and one of the central lines being preferably heavier or of a contrasting color to the other lines. The member 66 is arranged with dots 94 in predetermined relation to the digits on said bar as shown in Figure 10, and as the impression is made on the web such dot will be indicated on the web in relation to the parallel lines in accordance with the weight of the load and read in connection with the printed digits, the numeral record of which is made in increments of one hundred pounds, as shown at the top of Figure 8 in which the numeral characters "1400" have been printed on the web and the dot 94 is printed on the seventh line or at the right of the sixth space which will indicate that the recorded weight of the weighing is "1460" pounds.

To indicate whether the scale-beam was at equilibrium or not at the time the record was made means are provided to print a dot 95 (Figure 8) in relation to the heavy line or of contrasting color on the web. The web is fed transversely of the bar 66 in predetermined relation thereto with the lines occupying the space between adjacent digits "0" and "100" in the normal position of the bar 66 with the counterpoise in initial position on the scale-beam. The impression device 95' for printing this dot is carried by a member 96 (Figure 10) connected at one end to an arm of a pivoted bell crank lever 97 connected by a link 98 to an arm 99 fixed to a shaft 100, and said shaft having an arm 101 fixed thereon connected by a link 102 to the disk support 44. This dot printing character when the scale-beam is in equilibrium will be in position to print upon the heavy or line of contrasting color on the web. Should the scale-beam be in underbalance position the carrier for said character will be moved to position to print said dot character at the right of said line due to the movement imparted thereto by the connection of the carrier for said character with the disk support; and should the scale-beam be in overload position the carrier for this character will be moved to position to print such character at the left of the heavy or line of contrasting color.

To make consecutive printed record members of the successive weighings a numbering device is provided and adapted to print such consecutive numbers on the web in relation to the printed record of the weighings. This mechanism comprises a numbering device (designated in a general way by N) carried by a yoke 103 pivotally supported at 104 and caused to impinge the ribbon and record strip against a fixed platen 105 to make an impression from the numbering device N upon the web. The numbering device is moved against this platen by electromagnetically operated means consisting of an electromagnet 106 connected in an open electric circuit and adapted to attract an armature 107 toward the core thereof upon the closing of the circuit, this armature being carried by one arm of a bell crank lever 108, the other arm of which lever is connected by a link to the yoke 103 similar to the connection of the yoke 88 with the lever 92. The circuit for the magnet may be closed by a manually operated push button or automatically by the tripping of an electric contact as the load to be weighed is placed upon the platform or load receiver. The number of the consecutive weighings is preferably printed upon the strip or web and before the load is weighed, and the weight of the weighings printed in juxtaposition to such record number of the weighing upon the weighing of the successive loads. Means are provided to trip the numbering wheels of the numbering device N upon each operation thereof to advance such numbering wheels one increment.

Simultaneously with the printing of a record of the number of a weighing, means are actuated for feeding the web with the ink ribbon a predetermined distance. To feed the web the numbering device carrying yoke 103 is connected by a link 110 with a lever 111 loose on the shaft of the wheel 72, such lever carrying a spring influenced pawl 112 co-operating with a ratchet wheel 113 rotatable with the wheel 72. As the numbering device N is moved toward the platen 105, the pawl 112 through its connection with the support for the numbering device is caused to move backward and ride over the teeth of the ratchet wheel and as the numbering device is returned to initial position said pawl is caused to engage with a tooth of the ratchet wheel and move the same forward, retrograde movement of the ratchet wheel being prevented by a spring influenced detent 114. The movement of the wheel 72 is transmitted to the take-up reel 75 by a belt 115 passing around a pulley 116 rotatable with the wheel 72 and a pulley 117 rotatable with the take-up reel. The belt is maintained under tension and taut by yieldingly urging the end of the lever 76 carrying the take-up reel outward by a spring 118 connected at one end to the end of the lever 76 opposite to the take-up reel and the other end of the spring connected to a fixed part. As the numbering device returns to initial position a pawl 128 pivotally connected to the operating support of the numbering device is caused to co-operate with a ratchet wheel 119 fixed to the shaft 86 of the ribbon feeding means to rotate said shaft and thereby rotate the conected ribbon spool shaft to feed the ribbon.

Figure 1:
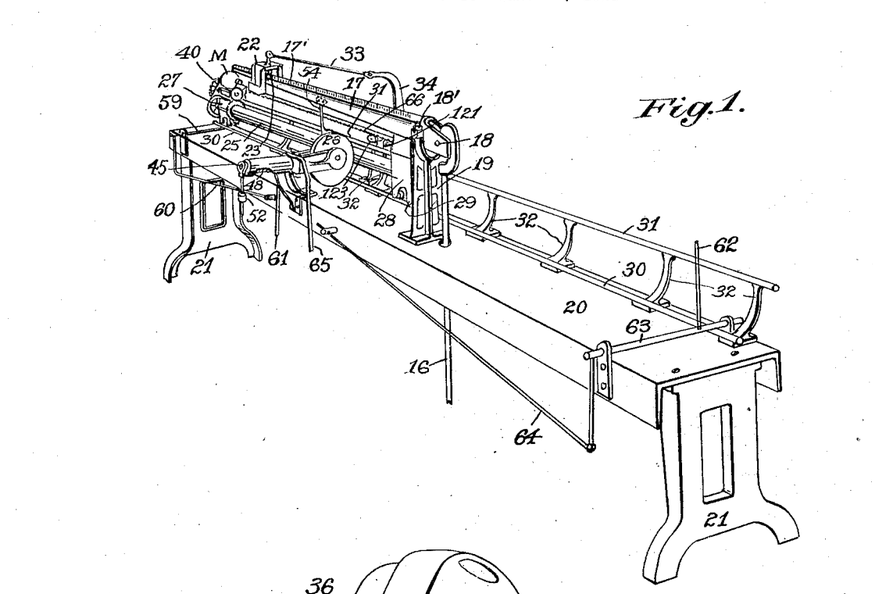
Figure 1 is a perspective view illustrating an embodiment of my invention, illustration of the load receiving means or platform being omitted as the same may be of any well known platform scale or other structure and illustration thereof is therefore not deemed necessary.
Figure 2:
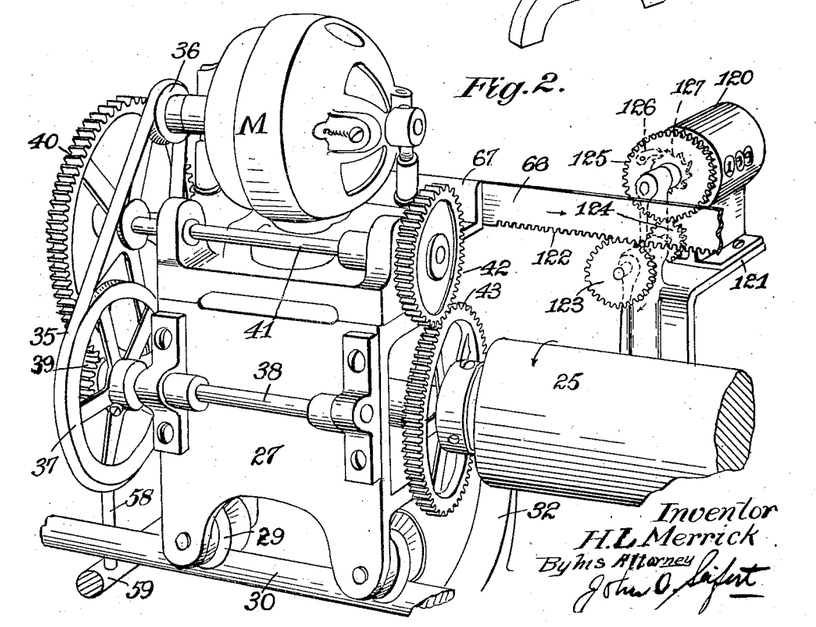
Figure 2 is an enlarged perspective view of the driving means for the rotatable and longitudinally movable member to adjust counterpoise weight upon the scale-beam, and showing the manner of supporting one end of said member, and means to totalize the weight of successive weighings and indicate such weight.

To totalize and indicate the total weight of successive weighings a counter 120 is provided (Figure 2). This counter is carried by a bracket 121 fixed to the shelf 20 and is adapted to be actuated by the movement of the impression making bar 66. For this purpose the bar is arranged with rack teeth 122 with which a gear 123 meshes to rotate said gear by the movement of the bar. A pinion 124 rotatable with the gear 123 meshes with a gear 125 loose on the shaft of the number wheels of the numbering device or counter, said latter gear carrying a spring influence pawl 126 to co-operate with a ratchet wheel 127 fixed to the shaft of the numbering wheels of the counter. As the bar 66 is moved with the drum carriage in moving the counterpoise along the scale-beam to bring the beam into equilibrium with a load supported thereby the gears 123 and 124 are rotated and during this rotary movement of the gear 125 the pawl 126 will ride over the teeth of the ratchet wheel 127 and impart no movement to the numbering wheels. As the bar 66 moves in reverse direction as the counterpoise is moved to initial position on the scale-beam the rotary movement imparted by said bar and connected gearing to the gear 125 will cause the pawl 126 to engage a tooth of the wheel 127 rotating the numbering wheels.

When the printed record of the total of a series of weighings is desired a type printing counter can be used for counter 120 and impressions made therefrom on a ticket or web of paper in a manner similar to that illustrated and described for printing the weight of each weighing by a platen or hammer 87, web 69, and ribbon 77, Figure 6 and Figure 7.

Having thus described my invention, I claim:

1. In weighing mechanism, a pivotally supported scale-beam; a counterpoise movable along the beam; and mechanical means automatically operable when the beam is moved out of equilibrium to adjust the counterpoise to bring the beam into equilibrium, said movement of the counterpoise being at a varying velocity depending on the amount of deflection of the beam.

2. In weighing mechanism, a pivotally supported scale-beam arranged to support a load therefrom; a counterpoise movable along the beam; and mechanically operated means connected to the counterpoise and operative to maintain the counterpoise against movement while the beam is at equilibrium and to move said counterpoise along the beam when the latter is deflected and in a direction in accordance with the deflection of the beam, said movement of the counterpoise being at a varying velocity dependent on the amount of deflection of the beam.

3. In weighing mechanism, a pivotally supported beam having load receiving means connected thereto; a counterpoise movable along the beam; and continuously operating mechanical means normally operative to maintain the counterpoise against movement and operative when the beam is deflected by a load on the load receiving means to move the counterpoise along the beam and counterbalance the load on the receiver, and to move the counterpoise in an opposite direction when the beam is deflected by the removal of the load from the load receiving means to bring the beam to initial position of equilibrium.

4. In weighing mechanism, a scale beam; a counterpoise to travel along the beam; a rotatable element movable longitudinally of the beam connected to the counterpoise; and friction means to co-operate with the rotatable element and adjustable to change the direction of travel thereof in angular relation to the axis of said rotatable element and co-operate therewith to move said element longitudinally and therewith the counterpoise along the beam when the beam is deflected from the equilibrium to bring the counterpoise to a point of perfect balance.

5. In weighing mechanism, a beam; a counterpoise to travel along the beam; a drum rotatable on an axis extending longitudinally of the beam and adapted to have longitudinal movement and connected to the counterpoise; and a rotatable disk to frictionally engage the drum adjustable to change the direction of travel thereof in angular relation to the axis of the drum to move the drum axially and the counterpoise along the beam when the beam is deflected from the equilibrium to bring the counterpoise to a point of perfect balance.

6. In weighing mechanism, the combination with a load receiver and supporting means therefor, of a rotatable element reciprocable longitudinally of the beam; a counterpoise adjustable upon the beam connected to the rotatable element to participate in the reciprocating movement thereof to counterbalance a load upon the load receiver; and rotatable means to co-operate with the rotatable element of the counterpoise to adjust said element longitudinally and thereby position the counterpoise upon the beam to counterbalance the load upon the load receiver.

7. In weighing mechanism, a scale beam having load receiving means connected thereto; a counterpoise movably mounted upon the beam; a rotatable element movable axially and longitudinally of the scale beam to adjust the counterpoise along the beam; and means to co-operate with said rotatable element when the beam is deflected to cause said element to move axially and adjust the counterpoise to counterbalance the load upon the load receiver.

8. In weighing mechanism, the combination with a beam having a load receiver connected thereto, of a counterpoise adjustable upon the beam to counterbalance a load upon the load receiver; a rotatable element movable axially and longitudinally of the beam to adjust the counterpoise on the beam; and means co-operating with said rotatable element operable by the deflection of the beam to cause said element by the rotation thereof to be moved longitudinally for the purpose specified.

9. In weighing mechanism, a beam having a load receiver connected thereto; a counterpoise movably mounted upon the beam; and a pair of co-operating rotatable members, one of which members is axially movable and to which the counterpoise is connected, and the direction of travel of the other member adapted to be changed in angular relation to the axis of rotation of the axially movable member to axially move the same when the beam is deflected to bring the counterpoise to a point of perfect balance.

10. In weighing mechanism, a weighing beam arranged with means to support a load therefrom; a counterpoise movably mounted on the beam; and a pair of cooperating rotatable friction members having connection with the counterpoise, one of which members is axially movable and the direction of travel of the other member acting upon the first member adapted to be changed in angular relation to the axis of and acting to move the same axially when the beam is deflected by a load supported thereby to move the counterpoise upon the beam to a point of equilibrium.

11. In weighing mechanism, the combination with load receiving means and adjustable counterpoise to bring the weighing mechanism to equilibrium by the applying of a load thereto, of a pair of rotatable members one of which has connection with the counterpoise and caused to be axially moved by the other member by the movement of the weighing mechanism out of equilibrium and adjust the counterpoise to bring the weighing mechanism into equilibrium.

12. In weighing mechanism, a beam; a counterpoise movably mounted upon the beam; a rotatable drum supported with its axis extending longitudinally of the beam and to have axial movement longitudinally of the beam; and a friction disk to coact with the drum to move the same axially when the beam is deflected for the purpose specified.

13. In weighing mechanism, a pivotally supported beam; a counterpoise movably mounted upon the beam; a rotatable drum supported to have movement longitudinally of the beam and having connection with the counterpoise; and a rotatable disk supported to normally have contact with the drum with the axis thereof parallel with the axis of the drum and adapted to have adjustment angularly to the axis of the drum and in such position to act upon the drum to move the latter axially for the purpose specified.

14. In weighing mechanism a pivotally supported beam; a counterpoise movably mounted upon the beam; a rotatable drum connected to the counterpoise and supported to have movement longitudinally of the beam; a disk; and means to support said disk to frictionally engage the drum with the axis thereof normally parallel with the axis of the drum and adjustable by the deflection of the beam to position the disk with the axis thereof in variable angular relation to the axis of the drum for the purpose specified.

15. In weighing mechanism, a beam having load receiving means connected thereto; a drum; means to rotatably support the drum for axial movement longitudinally of the beam; poise weight mounted upon the beam and connected to the drum to have movement along the beam with the movement of the drum; a rotatable disk to frictionally engage the drum; and means controlled by the beam to support the disk to normally maintain the disk in axial parallel relation with the axis of the drum and adjustable by the deflection of the beam to change the axial position of the disk angularly relative to the axis of the drum for the purpose specified.

16. In weighing mechanism a beam having a load receiver connected thereto; a drum supported to have axial movement longitudinally of the beam; counterpoise adjustably mounted upon the beam and connected to the drum to have movement along the beam with the movement of the drum; a rotatable disk to frictionally engage the drum; means to support said disk; connection between said support and beam to adjust the disk to change the axial position of the disk relative to the axis of the drum by the deflection of the beam; and means to rotate the drum and disk.

17. In weighing mechanism, the combination with load supporting means and poise weight to counterbalance the load supporting means, of means to automatically adjust the poise weight to counterbalance the load supporting means comprising a pair of frictionally engaging rotatable members and one adapted to be rotated from the other, one of which members is connected to the poise weight and axially movable and the other being adjustable to change the axial position thereof angularly relative to the axis of the axially movable member; and means to rotate one of said members.

18. In automatic weighing mechanism, a beam having load receiving means connected thereto; a counterpoise adjustably mounted upon the beam; a pair of frictionally co-operating rotatable members one of which is axially movable and having connection with the counterpoise, and the other being adjustable to change the axial position thereof in angular relation to the axially movable member in a direction by and in accordance with the deflection of the beam for the purpose specified.

19. In weighing mechanism, the combination with a beam having load supporting means connected therewith, of a poise weight adjustably mounted on the beam; a drum; means in which the drum is journaled to have movement longitudinally of the beam; connection between the drum and poise weight; a disk to have frictional contact with the drum adjustable on an axis transverse to its axis of rotation and normally maintained in position to rotate on an axis parallel with the drum; and connection between said disk and the beam to alter the plane of rotation of the disk by the deflection of the beam for the purpose specified.

20. In weighing mechanism, the combination with a beam having load receiving means connected thereto, of a poise weight adjustably mounted on the beam; a drum; means having connection with the poise weight in which the drum is journaled and mounted to have movement with the drum longitudinally of the beam; means to rotate the drum; a disk yieldingly urged toward the drum to have frictional contact therewith; means in which the disk is journaled supported to have adjustment on an axis transverse to the axis of rotation of the disk between the beam and disk; and a connection support for causing movement of the beam to adjust the disk support with the disk for the purpose specified.

21. In weighing mechanism, the combination with a beam arranged to support a load therefrom, of a counterpoise movable along the beam; a rotatable drum; means having connection with the counterpoise in which the drum is journaled mounted to have movement with the drum longitudinally of the beam; a disk to frictionally contact with the drum; a support for the disk mounted to have movement on an axis transverse to the axis of rotation of the disk and yieldingly urged in a direction to cause the disk to contact with the drum; and connections between the beam and the disk support to adjust the disk in accordance with the deflection of the beam by the imposition of a load or the removal of a load from the beam to change the plane of rotation thereof in angular relation to the axis of the drum to cause the drum to move axially and thereby the counterpoise along the beam to bring the beam into equilibrium.

22. In weighing mechanism, the combination with a beam arranged to support a load therefrom, of counterpoise movably mounted on the beam; a rotatable drum mounted to have movement longitudinally of the drum and having connection with the counterpoise; a disk frictionally driven from the drum; a support for the disk having a bifurcation in which the disk is journaled, said support being mounted to have rotative movement on an axis transverse to the axis of the disk; means to co-operate with the disk support to yieldingly urge the disk into frictional contact with the drum; and connections between the beam and the disk support to rotatably adjust the disk support by and in accordance with the deflection of the beam by the applying of a load to or the removal of a load from the beam to change the axial position of the disk in angular relation to the axis of the drum and cause the drum to move longitudinally of the beam and thereby the counterpoise along the beam to bring the beam into equilibrium.

23. In weighing mechanism, the combination with a beam having means to support a load therefrom, of a counterpoise movably mounted upon the beam; a rotatable drum; a carriage in which the drum is journaled having connection with the counterpoise; a track upon which the carriage is mounted to have movement with the drum longitudinally of the beam; means to rotate the drum; and a disk frictionally driven from the drum, said disk being normally maintained in position with the axis thereof parallel with the axis of the drum and adapted to be adjusted by the deflection of the beam to change the axial position of the disk in angular relation to the axis of the drum and thereby cause the drum to move longitudinally of the beam for the purpose specified.

24. In weighing mechanism, the combination with a beam having means to support a load therefrom, of a counterpoise movably mounted upon the beam; a rotatable drum having connection with the counterpoise and mounted to have movement longitudinally of the beam and thereby move the counterpoise along the beam; a disk frictionally driven from the beam having means to normally maintain the disk in position with the axis thereof in parallel relation with the axis of the drum, and said disk adapted to be adjusted to change the axial position thereof in angular relation to the axis of the drum and to thereby exert a thrust upon and cause the drum to move axially; and means controlled by the movement of the drum as the counterpoise approaches the limit of its movement upon the beam to adjust the disk to position with the axis thereof in parallel relation with the axis of the drum for the purpose specified.

25. In weighing mechanism the combination with a beam having means to support a load therefrom, of a counterpoise movably mounted on the beam; a rotatable drum connected to the counterpoise and adapted to have axial movement longitudinally of the beam; a member to have frictional contact with the drum and normally maintained to travel in a direction substantially at right angles to the axis of the drum, and said member adapted to be adjusted by deflection of the beam to change the direction of travel thereof in angular relation to the drum and thereby cause the drum to move axially for the purpose specified.

26. In weighing mechanism, the combination with a beam having means to support a load therefrom, of a counterpoise movably mounted upon the beam; a rotatable drum connected to the counterpoise and mounted to have movement longitudinally of the beam; and a member frictionally driven from the drum in a variable direction relative to the axis of the drum, and the angular relation of said member relative to the drum operating to maintain the drum against movement or to cause the drum to move longitudinally, and the angular position of said member being controlled by the movement of the beam.

27. In automatic weighing mechanism, the combination with a scale beam having means to support a load therefrom, of a counterpoise movably mounted on the beam; means controlled by the deflection of the beam to automatically move the counterpoise along the beam to bring the beam into equilibrium; and means to make a printed record from the weighing mechanism of the weighing and indicate whether or not the beam is in equilibrium at the time the record is made.

28. In weighing mechanism, the combination with a pivotally supported graduated scale beam having means to support a load therefrom, of a counterpoise movably mounted upon the beam; means controlled by the deflection of the beam to automatically move the counterpoise along the beam to bring the beam into equilibrium; a graduated bar movable with the counterpoise and having the indices reading in a direction opposite to the indices on the scale beam to form impression devices; and means to make an impression from the indices of said bar for the purpose specified.

29. In automatic weighing mechanism, the combination with a scale-beam having means to support a load therefrom, of a counterpoise movably mounted upon the beam; means controlled by the deflection of the beam to automatically move the counterpoise along the beam to bring the beam into equilibrium; means to make a printed record of the weighing from the weighing mechanism; and means to consecutively number the records of the successive weighings.

30. In weighing mechanism, the combination with a pivoted scale-beam having load supporting means connected thereto and a counterpoise movably mounted upon the same, of a bar movable with the counterpoise and arranged with numeral characters to correspond with the characters of the scale-beam and reading in opposite direction thereto; and means to make a printed record of the weighings from said bar.

31. In weighing mechanism, the combination with a pivoted scale-beam having load receiving means connected thereto and a counterpoise movably mounted upon the same, of a bar movable with the counterpoise and arranged with numeral characters to correspond with the characters of the scale-beam and reading in opposite direction thereto; and means to make a printed record of the weighings from said bar comprising a paper web movable transverse of the bar, an ink ribbon juxtaposed to the web, and a platen to impinge the ribbon against the web and bar.

32. In weighing mechanism, the combination with a pivoted scale-beam having means to support a load, of a counterpoise movable along the beam; a rotatable drum connected with the counterpoise movable longitudinally of the beam; means controlled by the deflection of the beam to cause the drum to move longitudinally to adjust the counterpoise along the beam and bring the latter into equilibrium; a bar movable with said drum having numeral characters to correspond with characters on the scale beam and reading in opposite direction thereto; and means to make an impression from said bar and thereby a record of a weighing.

33. In weighing mechanism, the combination with a load supporting lever and a counterpoise movably mounted thereon, of a graduated bar movable longitudinally with the movement of the counterpoise, and means to make a printed record of the weighings from said bar comprising a paper web fed transversely to said bar, an ink ribbon juxtaposed to the paper web, means to impinge the ribbon and web against the bar to make an impression from the beam on the web, and means to feed the ribbon and paper web upon the operation of said latter means.

34. In weighing mechanism, the combination with a load supporting graduated scale beam, of a counterpoise movably mounted on the beam; an auxiliary graduated beam movable with the counterpoise and having weight indicating numerals reading in a direction opposite to such numerals on the scale beam; a rotatably supported web roll; a take-up reel for said web, said web being adapted to be fed transversely of and maintained contiguous to the auxiliary beam; an ink ribbon; a platen operable to impinge the web and ribbon against the auxiliary beam to make an impression therefrom; and means operable by the actuation of the platen to feed the web.

35. In weighing mechanism, the combination with a graduated scale-beam and a counterpoise adjustably mounted thereon, of an auxiliary graduated beam adjustable with the counterpoise and having the graduations reading in opposite direction to the graduations on the scale beam; a web to lie contiguous to and fed transversely of the auxiliary beam; an ink ribbon juxtaposed to the web and auxiliary beam; means to impinge the ribbon and web against the auxiliary beam to make an impression therefrom on the web; means operable upon the actuation of said impression making means to feed the web; and means also operable upon the actuation of said impression making means to print consecutively the number of the successive weighings upon the web.

36. In weighing mechanism, the combination with a graduated scale-beam and a counterpoise adjustably mounted thereon, of an auxiliary graduated beam adjustable with the counterpoise having graduations reading in opposite direction to the graduations on the scale beam; a paper web arranged to be fed transversely and lie contiguous to the auxiliary beam in predetermined relation thereto; an ink ribbon; a platen movable toward the auxiliary beam to impinge the ribbon and web against said beam to make an impression on the web from the auxiliary beam; electromagnetic means connected in a normally open circuit; and means operable by the electromagnetic means upon the closing of the circuit to actuate the platen.

37. In weighing mechanism, the combination with a graduated scale-beam and a counterpoise adjustably mounted thereon, of an auxiliary graduated beam adjustable with the counterpoise and having the graduations reading in opposite direction to the graduations on the scale-beam; a web adapted to lie contiguous to and fed transversely of the auxiliary beam; an ink ribbon contiguous to the web; means to impinge the ribbon and web against the auxiliary beam to make an impression on the web from the beam; means operable with the impression making means to print consecutively the number of the successive weighings upon the web; electromagnetic means connected in a normal open circuit; and means operable by the electromagnetic means upon the closing of the circuit to actuate the impression making and numbering means.

38. In weighing mechanism, the combination with a load supporting graduated scale-beam and a counterpoise adjustably mounted upon the beam, of an auxiliary graduated beam adjustable with the counterpoise having weight indicating numerals reading in opposite direction to like numerals on the scale beam; a paper web arranged to be fed transversely of the auxiliary beam in predetermined relation thereof, said web having parallel lines extending longitudinally thereto to correspond with the graduations on said beam between adjacent weight numerals; a symbol printing device juxtaposed to the auxiliary beam in predetermined relation to the lines on the web and controlled by the movement of the scale beam to make an impression upon the web in relation to the lines thereon to indicate whether or not the beam was in equilibrium or in overload or underload position at the time an impression of a weighing was taken from the auxiliary beam; and means to impinge the ribbon and web against the auxiliary beam and symbol printing device.

39. In weighing mechanism, the combination with a load supporting graduated scale-beam and a counterpoise adjustably mounted thereon, of an auxiliary graduated beam adjustable with the counterpoise having weight indicating numerals reading in opposite direction to like numerals on the scale beam; a paper web arranged to lie contiguous to and be fed transversely of the auxiliary beam in predetermined relation thereto, said web having parallel lines extending longitudinally thereof to correspond with the graduations in said beam between adjacent weight indicating numerals; a platen operable to impinge the web and ribbon against the auxiliary beam to make an impression therefrom upon the web; and means operable upon the actuation of the platen to print consecutively the numbers of successive weighings upon the web in predetermined relation to the lines thereon.

40. In weighing mechanism the combination with a load receiving support, of means to make a record of the weighings from the weighing mechanism and to indicate whether or not the beam was in equilibrium or in underload or overload position at the time the record was made.

41. In weighing mechanism, a beam, a poise weight to counterbalance a load supported by the beam, means operative to impart movement to the poise weight when the scale beam is deflected, and means to confine the movement of the poise weight within predetermined limits.

42. In weighing mechanism, a beam; a counterpoise movably mounted upon the beam; a pair of frictionally co-operating members, one of which members is movable longitudinally of the beam and having connection with the counterpoise, and the other member being adjustable by and in accordance with the deflection of the beam to change the direction of travel thereof in angular relation to the longitudinally movable friction member; and driving means connected to one of said friction members.

Signed at New York city, in the county of New York and State of New York, this 11th day of January, 1921.

HERBERT L. MERRICK.